US008627280B2

(12) United States Patent
Roberts et al.

(10) Patent No.: US 8,627,280 B2
(45) Date of Patent: Jan. 7, 2014

(54) MULTI-TENANT COLLABORATIVE REVIEW SERVICE

(75) Inventors: Clark H. Roberts, Seattle, WA (US); Michael A. Cook, Seattle, WA (US); Victor W. H. Boctor, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 13/164,522

(22) Filed: Jun. 20, 2011

(65) Prior Publication Data

US 2012/0324419 A1    Dec. 20, 2012

(51) Int. Cl.
*G06F 9/44*    (2006.01)
(52) U.S. Cl.
USPC ............................. 717/113; 717/101; 717/105
(58) Field of Classification Search
None
See application file for complete search history.

(56) References Cited

U.S. PATENT DOCUMENTS

| | | | |
|---|---|---|---|
| 7,194,679 B1 | 3/2007 | Green | |
| 7,340,721 B1* | 3/2008 | Bailey | 717/113 |
| 7,386,831 B2* | 6/2008 | Flanagan | 717/103 |
| 7,603,653 B2* | 10/2009 | Sundararajan et al. | 717/105 |
| 7,712,073 B1* | 5/2010 | Srinivasan et al. | 717/105 |
| 7,849,440 B1* | 12/2010 | Englehart | 717/113 |
| 7,904,802 B1 | 3/2011 | Kolawa et al. | |
| 8,438,532 B2* | 5/2013 | Fox et al. | 717/101 |
| 2003/0131313 A1 | 7/2003 | Flanagan | |
| 2003/0179230 A1* | 9/2003 | Seidman | 345/750 |
| 2004/0117759 A1* | 6/2004 | Rippert et al. | 717/113 |
| 2005/0114841 A1 | 5/2005 | Moskowitz et al. | |
| 2006/0195818 A1 | 8/2006 | Berg et al. | |
| 2006/0282762 A1* | 12/2006 | Diamond et al. | 715/511 |
| 2007/0124373 A1* | 5/2007 | Chatterjee et al. | 709/204 |
| 2007/0240107 A1* | 10/2007 | Cowtan | 717/113 |
| 2008/0092116 A1 | 4/2008 | Kulkarni et al. | |
| 2008/0244418 A1* | 10/2008 | Manolescu et al. | 715/753 |
| 2008/0295085 A1 | 11/2008 | Rachamadugu et al. | |
| 2009/0049046 A1* | 2/2009 | Godzik et al. | 707/9 |
| 2009/0210860 A1 | 8/2009 | Sutherland et al. | |
| 2009/0249299 A1 | 10/2009 | Farchi et al. | |

(Continued)

FOREIGN PATENT DOCUMENTS

| | | |
|---|---|---|
| JP | 09212350 | 8/1997 |
| JP | 2001344103 | 12/2001 |

OTHER PUBLICATIONS

SmartBear, "Collaborator", 2012 SmartBear Software, Inc., pp. 1-10; <smartbear.com/.../media/.../11_Best_Practices_for_Peer_Code_Review.pdf>.*

(Continued)

*Primary Examiner* — Thuy Dao
*Assistant Examiner* — Ben C Wang
(74) *Attorney, Agent, or Firm* — Workman Nydegger (57) ABSTRACT

A multi-tenant collaborative review service that facilitates collaborative review of a review target artifact set. The service is multi-tenant in that it provides common functions and infrastructure that are available across multiple tenants supported by the review service. Furthermore, the review service is extensible in that it provides an extensibility point into which tenant-specific functions may be incorporated into the review service. For each one or more of the tenants, the corresponding review target artifact set is distributed such that a tenant-accessible subset of the artifact set is maintained uniquely accessible by the corresponding tenant, and such that a centralized service subset of the review target artifact set is maintained remote from the corresponding tenant.

19 Claims, 7 Drawing Sheets

(56) References Cited

U.S. PATENT DOCUMENTS

| | | | |
|---|---|---|---|
| 2009/0271768 A1 | 10/2009 | Goodson | |
| 2010/0269087 A1* | 10/2010 | Kabra | 717/101 |
| 2012/0041886 A1* | 2/2012 | Williams et al. | 717/113 |
| 2012/0204143 A1* | 8/2012 | Fox et al. | 717/113 |
| 2012/0272205 A1* | 10/2012 | Fox et al. | 717/101 |
| 2013/0124978 A1* | 5/2013 | Horns et al. | 715/243 |
| 2013/0191808 A1* | 7/2013 | Fox et al. | 717/101 |

OTHER PUBLICATIONS

Flix Raab, "Collaborative Code Reviews on Interactive Surfaces", 2011 ACM, ECCE 2011 Conference, Aug. 24-26, 2011, Rostock, Germany, pp. 263-264; <http://dl.acm.org/citation.cfm?id=2074771>.*

Müller et al., "An Approach for Collaborative Code Reviews Using Multi-touch Technology", 2012 IEEE, pp. 93-97; <http://ieeexplore.ieee.org/stamp/stamp.jsp?tp=&arnumber=6223031>.*

Cruciable—Retrieved Date: Feb. 25, 2011, (2 pages) http://www.atlassian.com/software/crucible/tour/.

Hammurapi—Retrieved Date: Feb. 25, 2011, (2 pages) http://www.hammurapi.com/dokuwiki/doku.php/products:hammurapi:start.

An Open Source App: Rietveld Code Review Tool—Retrieved Date: Feb. 25, 2011, (2 pages) http://code.google.com/appengine/articles/rietveld.html.

Collaborative Code Review Tool 1.2.1—Retrieved Date: Feb. 25, 2011, (2 pages) http://marketplace.eclipse.org/content/collaborative-code-review-tool.

EtherCodes: Collaborative Code Review & Editing Tool—Retrieved Date: Feb. 25, 2011, (9 pages) http://www.makeuseof.com/dir/ethercodes-collaborative-code-review/.

Google Mondrian: web-based code review and storage—Retrieved Date: Feb. 25, 2011, (7 pages) http://www.niallkennedy.com/blog/2006/11/google-mondrian.html.

Open source tools like Review Board—Retrieved Date: Feb. 25, 2011; (1 page) http://code.google.com/p/reviewboard/z.

SeeCode—A Code Review Plug-in for Eclipse—Published Date: 2008, (15 pages) http://www.researchibm.com/haifa/conferences/hvc2008/present/ShochatRazFarchi__25.pdf.

Code Collaborator—Retrieved Date: Mar. 30, 2011, (20 pages) http://smartbear.com/resources/cc/book/code-collaborator.pdf.

* cited by examiner

MULTI-TENANT COLLABORATIVE REVIEW SERVICE

BACKGROUND

Computer systems and services have revolutionized the way people live, work, and do business. The operation of such systems and services are directed, in large part, by computer software. Computer software is often generated by computer programmers drafting source code (i.e., a computer program). That source code is ultimately compiled or interpreted into machine readable code prior to and/or at execution time.

As the functionality of such computing systems and services has increased, computer programs have become ever more complex. Many computer programs are too complex to be authored by any one person. Accordingly, computer programs are often collaboratively authored by a team of computer programmers. In order to facilitate collaborative authoring of computer programs, a variety of helpful conventional collaborative authoring programs exist. For instance, such tools often permit the team to move from one version of the code to the next, until a final version of the code is achieved.

In addition to being more complex to author, the software should be carefully reviewed for each version of the code. Accordingly, collaborative review programs also exist. Thus, while collaborative authoring programs permit changes to be made in order to move from one version of the code to the next, collaborative review programs enable detailed review of each version of the code so as to understand and plan the changes that should be made in the next phase of authoring.

BRIEF SUMMARY

At least one embodiment described herein relates to a multi-tenant collaborative review service that performs a method for facilitating collaborative review of a review target artifact set that includes a primary goal component of review. As an example, the primary goal component may be a source code document. The service is multi-tenant in that it provides common functions that are available across multiple tenants supported by the review service. Furthermore, the review service is extensible in that it provides an extensibility point into which tenant-specific functions may be incorporated into the review service. For each of one or more of the tenants, the corresponding review target artifact set is distributed such that a tenant-accessible subset of the review target artifact set is maintained uniquely accessible by the corresponding tenant, and such that a centralized service subset of the review target artifact set is maintained remote from the corresponding tenant.

In one embodiment, the distribution of this review target artifact set is done to preserve the confidentiality of the tenant such that sensitive data that is proprietary to the tenant is left accessible only to the tenant, while less sensitive or non-sensitive data may be remote from the tenant, perhaps local to the review service. In some embodiments, when certain types of changes are made to the review target artifact set (e.g., perhaps the addition of a comment to a discussion thread), at least some of the other members of the tenant are notified in real-time. Thus, a multi-tenant collaborative and extensible review service is described.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a multi-tenant collaborative review service is described. The service facilitates collaborative review of at least one review target artifact set for each of multiple tenants. Each review target artifact set includes a primary goal component that is under review. As an example, the primary goal component may be a source code document. The review service is extensible in that it provides an extensibility point into which tenant-specific functions may be incorporated into the review service. Thus, though there may be common functions available to all tenants, tenants are still permitted a unique experience for each tenant. For each one or more of the tenants, the corresponding review target artifact set is distributed such that a tenant-accessible subset of the review target artifact set is uniquely accessible by the corresponding tenant, and such that a centralized service subset of the review target artifact set is maintained remote from the corresponding tenant. This distribution may be done to preserve confidences of the tenant. First, some introductory discussion regarding computing systems will be described with respect to FIG. 1. Then, the embodiments of the collaborative review service will be described with respect to FIGS. 2 through 7. Finally, an example client-side experience will be described with respect to FIGS. 8 and 9.

Figure 1:
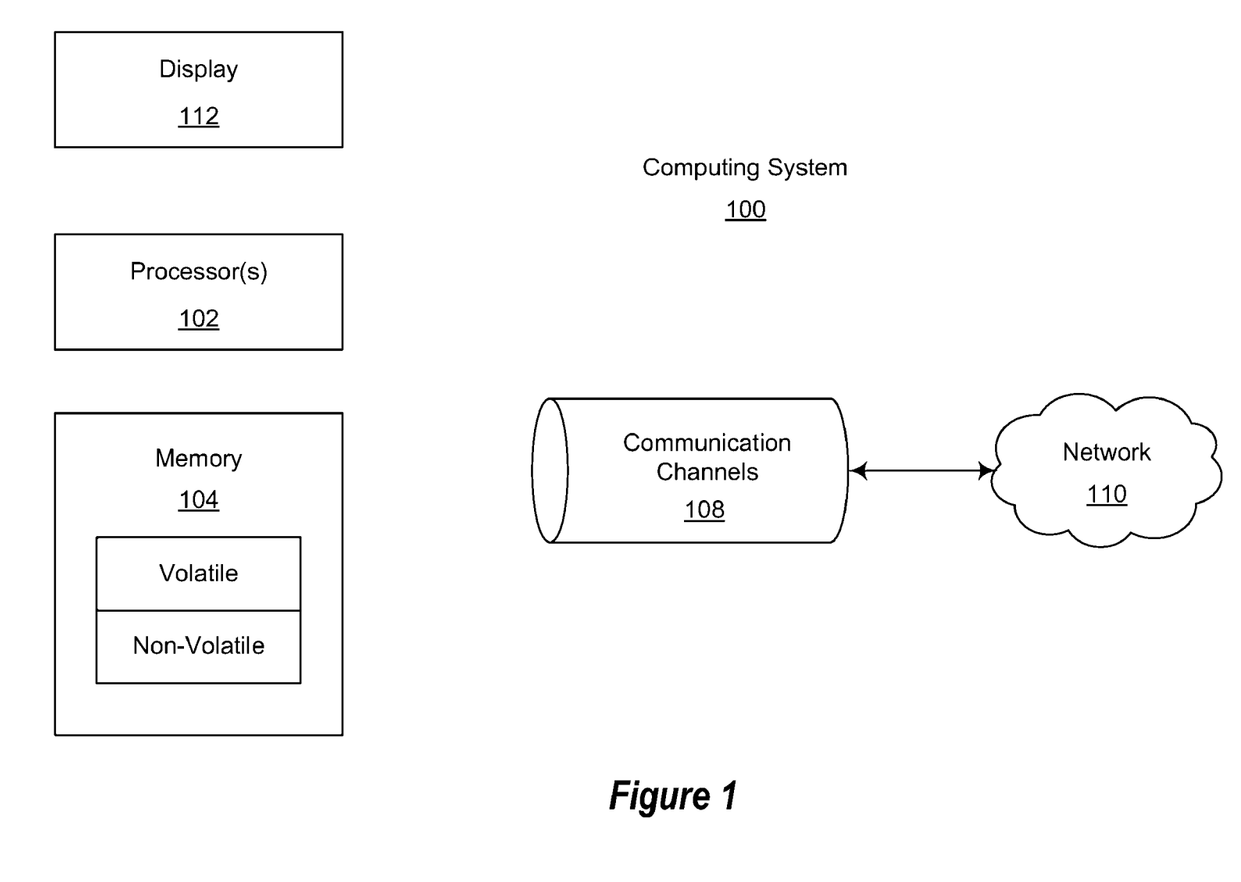
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system.

A computing system may be distributed over a network environment and may include multiple constituent computing systems. For instance, a service (such as a web service) is often a computing system that is distributed over a network. An example of the service is the review service described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other computing systems over, for example, network 110. The computing system may also include a display 112 that may display one or more user interfaces that a user of the computing system may interface with. For instance, if the computing system 100 were a client computing system, a user may interact with the computing system using the display 112. The display may, for example, display portions of the review target artifact set to the client. Applications that run on the client computing system are also referred to herein as "client-side applications". In the context of a review application, the client-side application may be responsible for displaying the portions of the review target artifact set, receiving updates regarding the review target artifact set from the review service, interpreting user input, notifying the review service of certain types of user input, and so forth.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
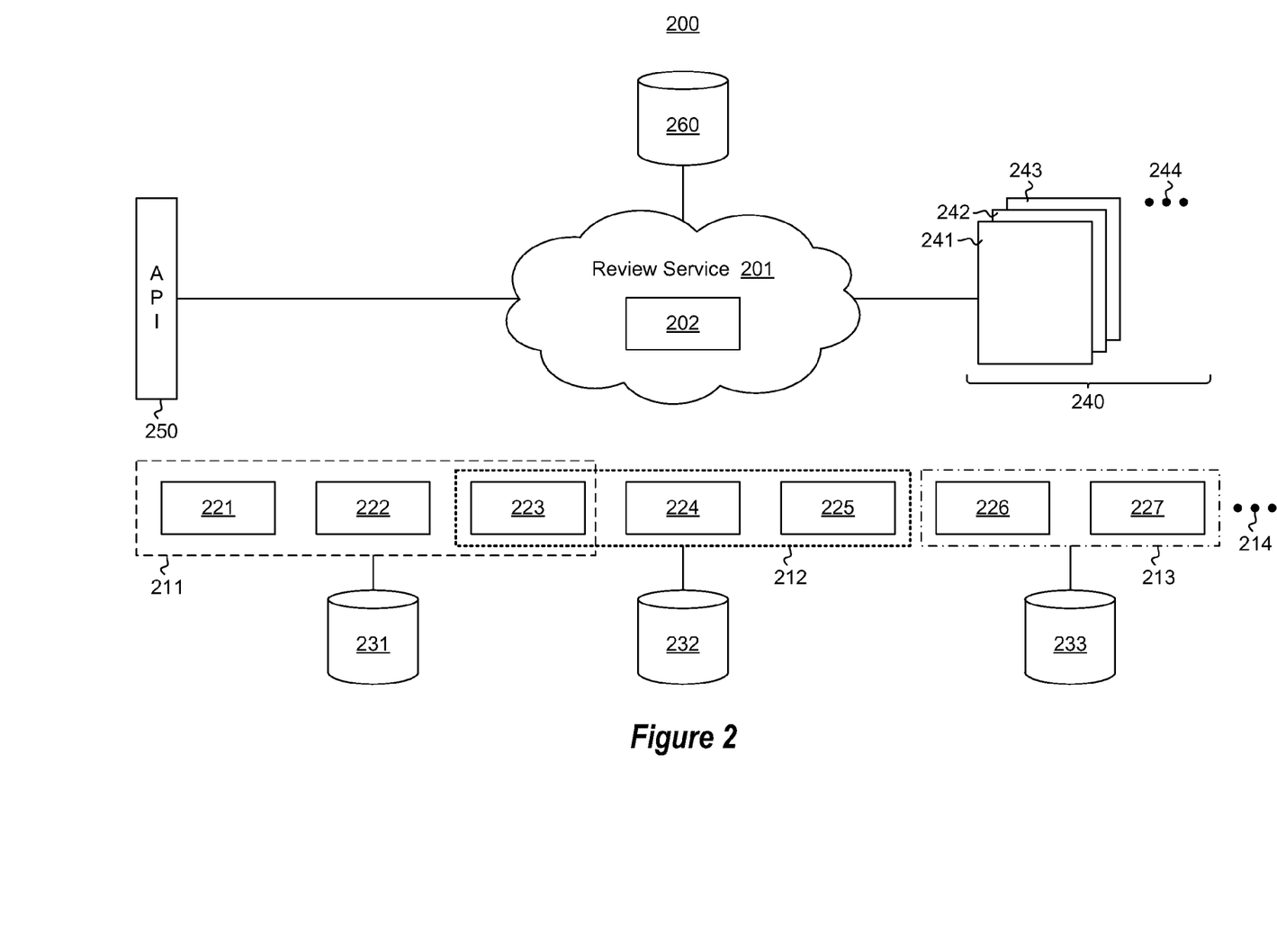
FIG. 2 illustrates a collaborative environment that includes a multi-tenant collaborative review service that facilitates collaborative review of a primary goal component using a review target artifact set.

FIG. 2 illustrates a collaborative environment 200 that includes a multi-tenant collaborative review service 201 that facilitates collaborative review of a primary goal component. The review service 201 may be performed by a computing system, or multiple interacting computing systems. Such computing systems may, for example, be structured as described above for the computing system 100 of FIG. 1. The review service 201 may be a software solution that is performed using a computer program product having one or more computer-readable storage media having thereon computer-executable instructions that are structured such that, when executed by the processor(s) of the computing system, cause the computing system to operate the review service or its portion of the review service.

The review service 201 is multi-tenant, each tenant having members that collaboratively review one or more corresponding primary goal components. For instance, one tenant may collaboratively review one component of a software package, another tenant may collaboratively review another component of the software package, and so forth. That said, confidentiality is preserved between tenants using mechanisms described hereinafter. Accordingly, one tenant may be from one company, and another may be from another company that is working on an entirely unrelated project. Furthermore, since the primary goal component for each tenant may be different, each tenant may be working on different kinds of primary goal components. For instance, one tenant might be working on source code text, while another tenant might be working on a design document, while yet another might be working on a word processing document.

In the example of FIG. 2, the review service 201 is illustrated as serving three tenants 211, 212 and 213. However, the ellipses 214 represent that the review service 201 may represent as few as one tenant to as many as thousands of tenants, or more, with no theoretical upper bound. However, there are preferably at least two tenants to take full advantage of the multi-tenant and extensibility features of the collaborative review service 201.

In this example illustrated in FIG. 2, there are three members 221, 222 and 223 of the tenant 211 as represented by the dashed-lined box. In addition there are three members 223, 224 and 225 of the tenant 212 as represented by the dotted-lined box. Note how member 223 is a member of two tenants 211 and 212, as occasionally a member may be working on two different teams. Finally, there are two members 226 and 227 of the tenant 213 as represented by the intermittent dotted-dashed lined box.

A member may be a human being that is a member of a team corresponding to the tenant, in which case the member may use a client computing system (including perhaps a client-side application) to interface with the review service. Alternatively, the member may be an automated analysis process performed by a computing system that has artificial intelligence capable of (and properly authorized to) perform a review. In one example, suppose that an author has published an iteration (or a version) of a source code document. Suppose further that the source code has an unreferenced variable or a variable with a name that does not match the standard naming conventions. An annotations function (an example of an automated analysis process) might find the unreferenced variable, perform some calculation to determine that this variable should be annotated, and add some comment to a discussion thread corresponding to this variable The memberships illustrated in FIG. 2 are of course just an example. A tenant may have any number of members, and sometimes the membership dynamically changes. For instance, if the tenant corresponded to a software development team that was working on a piece of source code, a new hire to that team would be added as a member of that corresponding tenant.

Each tenant 211 through 213 has their own data store 231 through 233 respectively. While these data stores 231 through 233 may be local to each corresponding tenant 211 through 213, respectively, that need not be the case. Nevertheless, regardless of where the data store is, the data stores 231 through 233 are uniquely accessible by the corresponding tenant 211 through 213. In this description and in the claims, the corresponding data store is "uniquely accessible" to the corresponding tenant in that entities that are not members of that tenant are not given access to the corresponding data store unless with the specific permission of the tenant. The review service maintains a high level of confidentiality between tenants by keeping the most sensitive tenant data on the corresponding tenant data store (hereinafter referred to as "tenant-accessible data" or a "tenant-accessible subset"), and may maintain less sensitive data, or completely non-sensitive data at a location remote from the tenant and more accessible to the review service 201 (hereinafter referred to as "centralized service data" or a "centralized service subset"). For instance, such less sensitive or non-sensitive data may be maintained at a data store 260 that is accessible to the review service 201. However, even though the data located at the data store 260 is less sensitive, the review service 201 may still impose security on access to such data providing protection so that such data is only provided to the corresponding tenant that owns that data.

The review service 201 includes common function(s) 202 that represent one or more functions that are common across all of the tenants 211 through 213. For instance, suppose that tenants 211 through 213 each correspond to a software development team, and that the primary goal component for each tenant is source code text. The common function(s) might include functions that would apply regardless of the development team. Perhaps these are functions that may be helpful to software development teams regardless of the preferences of the tenant. As an example, the common functions 202 might include a change tracking function, a versioning function, a notification function, a discussion thread function, statistics functions, and so forth.

For instance, the statistics function might track statistics such as 1) how many and which members are actively working on reviewing the primary goal component, 2) how much time has elapsed since anyone or a particular member has commented on the primary goal component, 3) who has signed-off on the primary goal component, 4) the average length of time between the time that members start reviewing until the time that they sign-off on the primary goal component, 5) the average time between the time that the review service receives notice of a change to the review target artifact set (described with respect to FIG. 3) and the time that this change is distributed to other members of the tenant, 6) the processing, memory and other resources used to service a particular tenant, and so forth. The review service 201 may perform any other desired statistics as well using the information provided to it.

The fact that the review service is multi-tenant and provides common functions across all tenants allows multiple tenants to use the review service, rather than forcing each tenant to find their own collaborative review mechanism. Still, the experience of each tenant is separated from the experience of other tenants such that the appearance to each tenant is that the review service is helping just them. Accordingly, the review service is an efficient way of facilitating collaborative review for multiple tenants.

The review service 201 also includes tenant-specific functions 240 that may be incorporated into the review service. These tenant-specific functions 240 may each apply to only a subset of the tenants 211 through 213. In a simple example, the tenant-specific functions 240 includes three tenant-specific functions 241 through 243, though ellipses 244 represent that that there may be other numbers of tenant-specific functions. Any given tenant may have one or more tenant-specific functions applied to them. In some case, there might be a tenant that is just to have the common functions 202 applied, with no tenant-specific functions. As a specific example, perhaps tenant-specific function 241 may be applied only to tenant 211, tenant-specific function 242 may be applied only to tenant 212, and tenant-specific function 243 may be applied only to tenant 213.

Tenant-specific functions are functions that maybe do not apply across all of the tenants 211 through 213, but may apply specifically to the objectives and preferences of the team. As an example, one team might use sign-offs, whereas another may not. In that case, the sign-off function might be applied to tenant 211, but not tenants 212 and 213. Another example is a policy function. For instance, one tenant might require two sign-offs to mark a review as complete, while another may require only one. Even though both tenants might use the same policy function, they may have different configurations or thresholds. Another tenant may have certain preferences with respect to how revisions are shown when comparing versions of the primary goal component. One might prefer to show added text in one way (e.g., highlighted yellow), while another might prefer another mechanism (e.g., underlining). These preferences may also be expressed as part of the tenant-specific functions. In one embodiment, the tenant-specific functions 241 through 243 are each hierarchically structured documents, such as eXtensible Markup Language (XML) documents. However, the tenant-specific functions might alternatively be plug-in code, or any other mechanism that is recognized by the review service 201.

As previously mentioned, the server-side functions 240 are provided to facilitate tenant-specific functionality. There may also be client-side functions as well that collaborate with the common functions 202 and/or with the tenant-specific functions 240 to provide further customization for each tenant.

The review service 201 provides an application programming interface 250 that the tenants 211 through 213 may use to communicate with the review service 201. For instance, one specific example is that the tenants 211 through 213 may communicate with the review service 201 for purposes of modifying tenant-specific functions 240 that apply to the corresponding tenant. For example, the tenant may add a tenant-specific function to the tenant-specific functions 240, or perhaps modify or replace one of the tenant-specific functions. The tenant may also set user preferences, customization, or to set other configuration data that is offered by the common functions 202.

Figure 3:
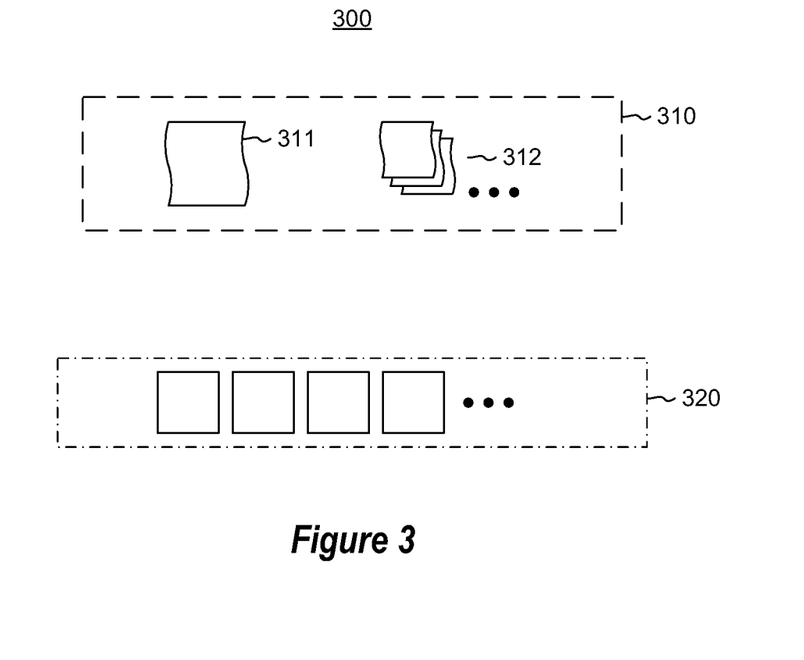
FIG. 3 illustrates a review target artifact set that is presented to show the various data that supports each tenant.

FIG. 3 illustrates a review target artifact set 300 that is presented to show the various components that support the collaboration experience for each tenant. Thus, since each tenant has a different primary goal component, each tenant will use a different review target artifact set 300. The review target artifact set 300 includes authored data 310. The authored data includes the primary goal component 311, but also includes secondary components 312 that comment on the primary goal component 311.

The primary goal component 311 is actually the subject of the collaboration. The primary goal component 311 may include text, images, icons, or any other renderable component, or combinations thereof. For instance, the primary goal component might be a text document such as a source code document, a design document, or some other type of word processing document.

The secondary components 312 of the authored data are authored data (e.g., other text) that is in support of the collaborative review of the primary goal component 312. As an example, the secondary components 312 may be discussion threads that correspond to a region of the primary goal component 311. This region may be a word, partial line, any number of lines, or any other portion of the primary goal component 311.

More specifically, suppose that the primary goal component 311 were source code text, there might be a thread highlighting a branching statement that includes some discussion about what the conditions of the branching statement should be. There might be multiple contributors to that discussion thread with multiple members of the tenant weighing in on the question.

In another portion of the source code, there may be an integer declaration of a variable. There might be a corresponding discussion thread regarding that declaration concerning the issue of whether the integer declaration should really be a floating point declaration and the discussion of some circumstances in which it may be more accurate for that variable to take on a fractional value. Thus, using such discussion threads, multiple minds can gather concerning a very focused issue in the primary goal component. In one embodiment, such discussion threads are updated substantially in real-time. This allows for consolidated and efficient gathering of thoughts of team members regarding various portions of the primary goal component.

Some discussion threads may be design oriented. For instance, perhaps a reviewer has commented regarding whether an identified class is cohesive, and/or perhaps has unnecessary coupling to a particular component.

Some discussion threads may be logic oriented. For instance, a reviewer may comment regarding some consequences to the execution of the code (e.g., the system will crash) if a particular parameter value (e.g., a negative value) is passed into the identified method.

Some discussion threads may be stylistically oriented. For instance, a reviewer might comment that an identified portion of the code may read better if the code were to be modified in some way.

Some discussion threads may be general or give some type of constructive feedback. For instance, a reviewer might give praise for a fix to some identified region of code, or may perhaps compliment on how well a region of code is drafted on short notice.

The review target artifact set 300 also includes metadata 320, which is tenant-specific metadata regarding the primary goal component 311 or regarding other administrative tenant-specific matters. The types of such metadata 320 are not limited, but could be, for example, sign-off data, member status data, tenant membership data, preference data, customization data, primary goal component information such as creation date and size, and so forth. For instance, the member status data may include a status of a review of the primary goal component such as (but not limited to): whether the reviewer has started the review, is in the process of reviewing, is waiting for the author(s), or has signed-off on the review.

The review service 201 maintains confidentiality of each tenant by distributing the review target artifact set 300 appropriately between the data store of the tenant (e.g., data store 231 of tenant 211) and the data store 260 of the review service 201, as previously mentioned. The tenant itself may specify, as part of their preferences, which data is permitted to reside where, or which data they consider to be too sensitive to store at the review service. For instance, perhaps some of the authored data 310 is located at the tenant, and some of the authored data 310 is located at the review service.

In one embodiment, most of or all of the primary goal component 311 remains in the tenant data store, whereas other secondary components 312 of the authored data 310 (such as the discussion thread data) may be stored remotely at the review service data store 260. In addition, perhaps the metadata 320 also may be stored at the review service data store 260. The metadata 320 may further include other pointers or references that the review service 201 may use to properly notify the tenant of changes such that the client interfaces may be updated accordingly.

Such pointers and references are particularly useful as the review service 201 may not have a copy of the primary goal component itself, but may still need to direct the client that the member is using to the appropriate location. For instance, though the review service may not actually have a copy of a source code document that is under review, the review service may have a copy of a discussion thread, and may have a correlation of that discussion thread with a particular address (e.g., line number, column number range) within the source code text. As another example, if the client wants to compare two versions of the primary goal component, the review service may be able to direct the client to the appropriate storage locations for those two versions.

Figure 4:
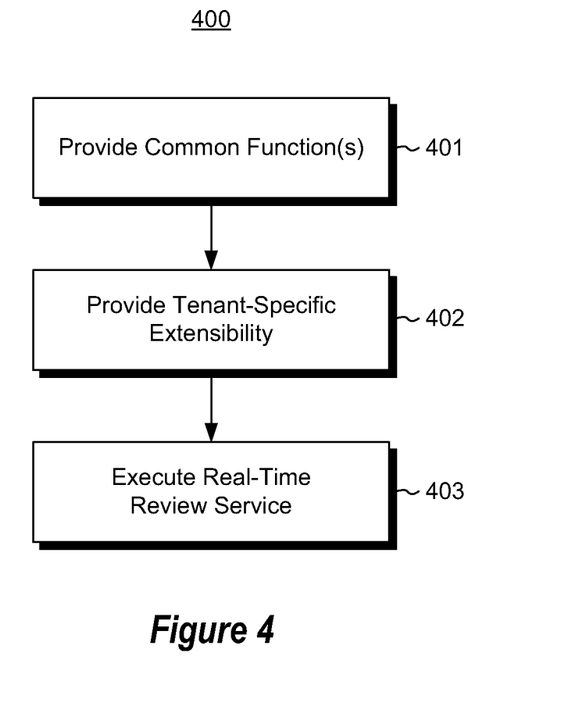
FIG. 4 illustrates a flowchart of a method for facilitating collaborative review of a primary goal component.

FIG. 4 illustrates a flowchart of a method 400 for facilitating collaborative review of a primary goal component. The method 400 includes providing common functions (act 401) that are available across a plurality of tenants supported by the review service. Referring to FIG. 2, such primary functions could be, for example, the common function(s) 202. The method 400 also includes providing an extensibility point (act 402) into which tenant-specific functions may be incorporated into the review service. Referring to FIG. 2, the extensibility point may be the API 250 or any other mechanism that would allow tenant-specific functions to be available to the review service 201. The review service then executes a real-time review service using the common functions and the tenant-specific functions (act 403).

The "real-time" review service causes, in at least some instances, each of at least some members of the tenant to be updated when a change has occurred to the primary goal component or the secondary components of the authored data. As an example, suppose a tenant member adds a comment to a discussion thread regarding a portion of the primary goal component. The review service may identify that this has occurred, and make a decision to notify each member of the tenant (that is authoring and/or reviewing the primary goal component) of the change immediately. That way, each relevant review member of the tenant may see the new comment as soon as the review service is able to notify them. In some cases, this may take as little as a few seconds, or even a fraction of a second, perhaps even leading to a real-time two way conversation held through the review service with focus on a particular portion of the primary goal component. On the client machine, that discussion thread may be visually associated with the corresponding portion of the primary goal component to which the discuss thread is related.

This notification may be made directly to a client application assuming that the reviewer has a client-side application open that renders the change. However, the change may also be transmitted alternatively or additionally by e-mail, thereby allowing even those reviewers who do not have the client-side application open to be notified of the change. However, the principles described herein are not limited to the manner in which the reviewers are notified, nor to the number of reviewers that are notified in particular ways.

Figure 5:
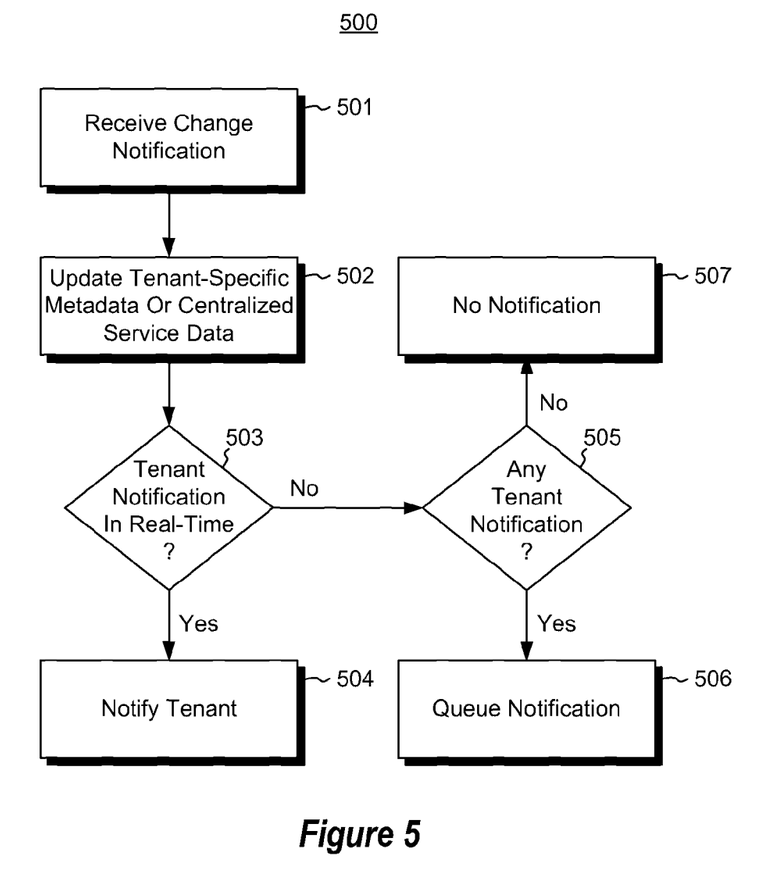
FIG. 5 illustrates a flowchart of a method for the review service to respond to notification of modification to facilitate selective real-time updating of the client.

FIG. 5 illustrates a flowchart of a method 500 for the review service to respond to notification of modification to facilitate selective real-time updating of client machines across the reviewers on the tenant. In this method, the review service is configured to update at least some of members of a corresponding tenant when one of the tenant-specific metadata 320 and authored data 310 is updated.

The review service receives a notification of the update (act 501) to the target review artifact set corresponding to a tenant. The review service then updates the tenant-specific metadata or centralized service data (act 502) as appropriate. In order to do this, the review service 201 may execute one or more of the common functions 202, and may also execute any tenant-specific functions 240 that apply to the corresponding tenant.

For instance, suppose that the client receives a notification (hereinafter called the "comment example notification") in which a comment is appended to an existing discussion thread regarding a particular portion of a source code document. The review service would thereby update the thread discussion stored at the review service. As a second example, suppose that the client receives a notification (hereinafter called the "sign-off example notification"). In that case, the review service would update the metadata corresponding to the source code document to reflect the new sign-off status.

The review service then determines if member(s) of corresponding tenant are to be notified of change in real-time (decision block 503). If there is to be such a real-time notification ("Yes" in decision block 503), then the relevant member(s) of the tenant (e.g., those who are collaboratively reviewing the corresponding primary goal component) are so notified (act 504). The form of the notification may include any information that would be helpful to the client machine in rendering an update to the member. The formulation of this notification may be performed in response to the review service 201 executing one or more of the common functions 202 and/or one or more of the tenant-specific functions 240 corresponding to the tenant.

In the comment example notification, each member of a review team might be notified of updates in the discussion thread. The notifications back to the client may cause the client to reflect the notification in appropriate ways. For instance, in this case, as the user navigates to the portion of the primary goal component that corresponds to the discussion thread, the discussion thread may appear with the new comment visually emphasized. In this or other cases, another visualization may appear on the client to let each reviewer know as new comments are added to the discussion threads associated with the primary goal component.

In the sign-off example notification, a sign-off can be a significant event, as it indicates that a team member of the tenant considers the primary goal component in final form.

Thus, each team member might be notified of this particular event. The client machine may be made to reflect this sign-off status.

If the review service determines that no such notification should be made in real-time ("No" in decision block 503), then the review service may determine whether any notification should occur at all (decision block 505). If there is to be a notification, but just not a real-time notification ("Yes" in decision block 505), then the notification may be queued for later delivery (act 506). Alternatively, when there is notification, the notification is immediate and not queued, and is sent to the client-side application, or may be sent by e-mail. In this embodiment, the reviewer would either have the client-side application opened, or would just see the e-mail notification, in which case there would be no need for separate queuing of the notification. Regardless, if there is also not a need for any notification at all ("No" in decision block 505), no further action is taken (act 507). The criteria for determining when to send a notification and what to include in the notification may be set by the tenant to customize the experience and/or to support tenant-specific functions. The determination of whether to notify the other members of the tenant, which members to notify, and what should be included in the notification may be determined by execution of one or more of the common methods 202 and/or one or more of the tenant-specific methods 240.

Figure 6:
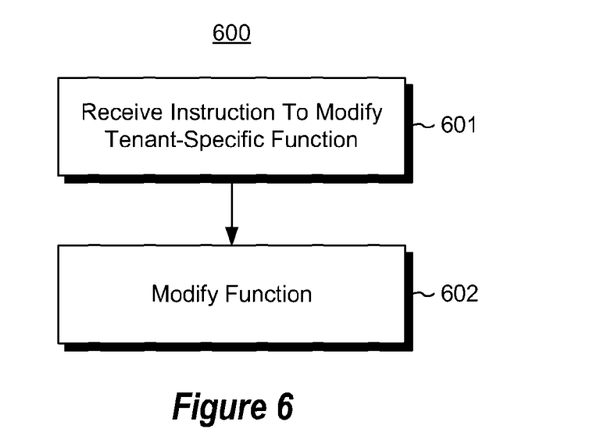
FIG. 6 illustrates a flowchart of a method for facilitating tenant-unique collaborative review of a primary goal component using a collaborative multi-tenant review service.

FIG. 6 illustrates a flowchart of a method 600 for facilitating tenant-unique collaborative review of a primary goal component using a collaborative multi-tenant review service. As previously mentioned, the application programming interface 250 or another mechanism may be used to modify the tenant-specific functions 240. The application programming interface 250 may also be used to set tenant or user preference or customization settings. Upon receiving an instruction to modify the tenant-specific functions (act 601) (e.g., through an application programming interface 250), the review service automatically modifies the tenant-specific functions (act 602). Such modification may, for example, include adding a tenant-specific function to the tenant specific functions, or perhaps modifying or replacing a tenant-specific function.

Accordingly, a multi-tenant collaborative review system has been described that allows for separation of the collaborative review experience by tenant in both access to data, and also in the overall functional experience. For efficiency, multiple tenants may thus be served by a single review service that also offers common functions across all (or at least a significant portion of) the tenants.

Figure 7:
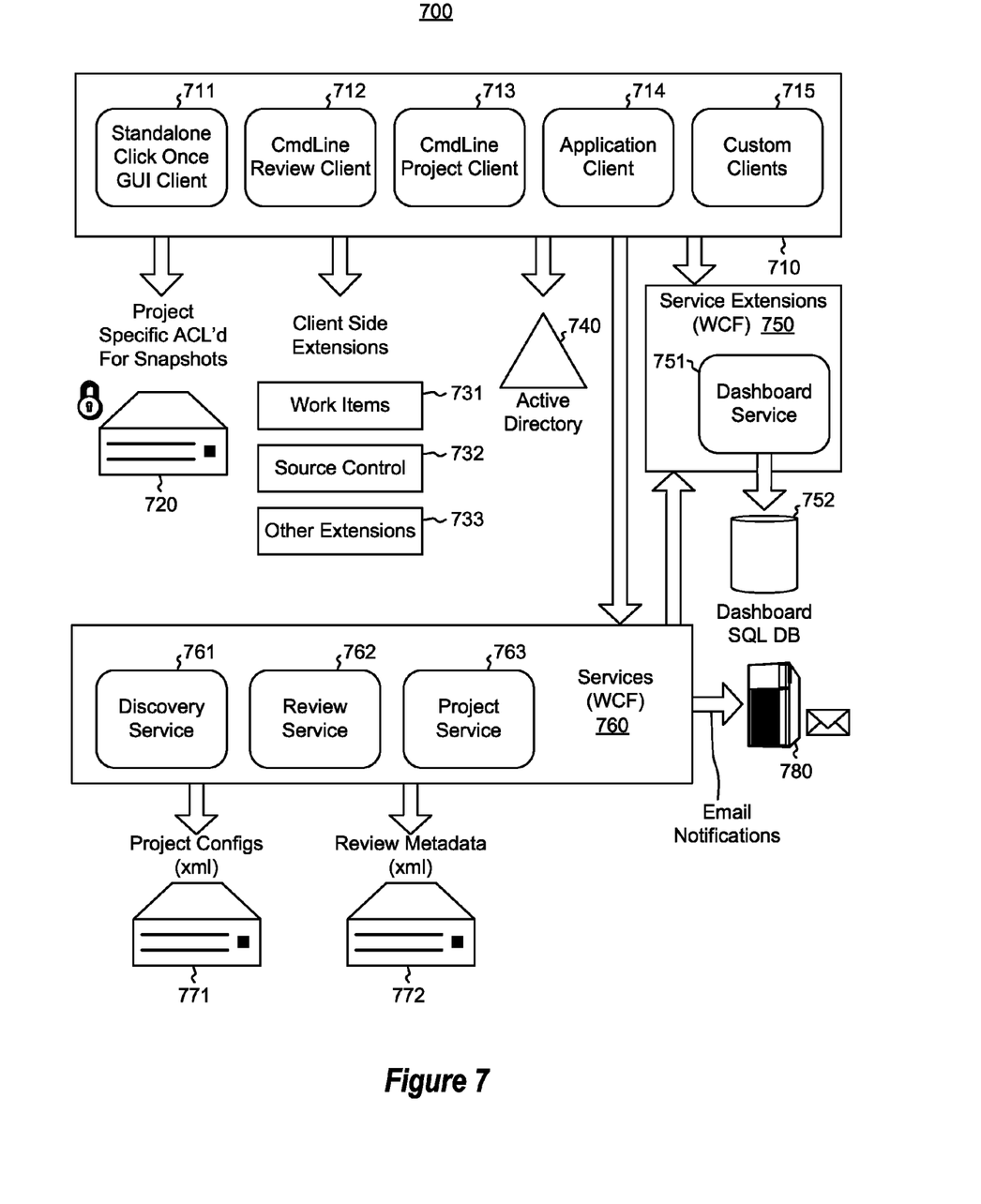
FIG. 7 illustrates one very specific embodiment of the collaborative environment of FIG. 2.

FIG. 7 illustrates one very specific embodiment 700 of the collaborative environment 201 of FIG. 2. Here, the clients 710 includes clients 711 through 715 are a variety of different types of client demonstrating that the principles described herein are not limited to a particular client type. In the illustrated case of FIG. 7, client 711 is a standalone graphical user interface client that installs an application when a user clicks on a link, client 712 is a command line review client, client 713 is a command line project client, client 714 is an application-specific client that is specific to the collaborative service, and client 715 is another custom client.

The data store 720 represents the local tenant store, which may be controlled using Access Control techniques. In addition to the service extensions represented by tenant-specific functions 240 in FIG. 2, there may be extensibility on the client-side as well as represented by the client side extensions 731, 732 and 733. Although not necessary, the clients 710 also may have access to an ACTIVE DIRECTORY® 740 for storing configuration information. Alternatively or in addition, the Active Directory may be used to lookup reviewer or author information. The service extensions 750 of FIG. 7 represent examples of the tenant-specific functions 240 of FIG. 2. In this case, the service extension 750 includes a dashboard service 751 that provides a dashboard-based user interface control to the client. The dashboard service 751 has access to a database 752. The dashboard service 751 is a client endpoint that the user can leverage to see what outstanding reviews require their attention/input.

The services 760 of FIG. 7 is an example of the review service 201 of FIG. 2. In this case, the common functions of the review service include a discovery service 761, a review service 762, and a project service 763. The services 760 have access to project configuration files 771 and review metadata 772. In one embodiment, the services 760 and the service extensions 750 are authored using WINDOWS® Communication Foundation (WCF). E-mail notifications from the services 760 may be made via the e-mail server.

Figure 8:
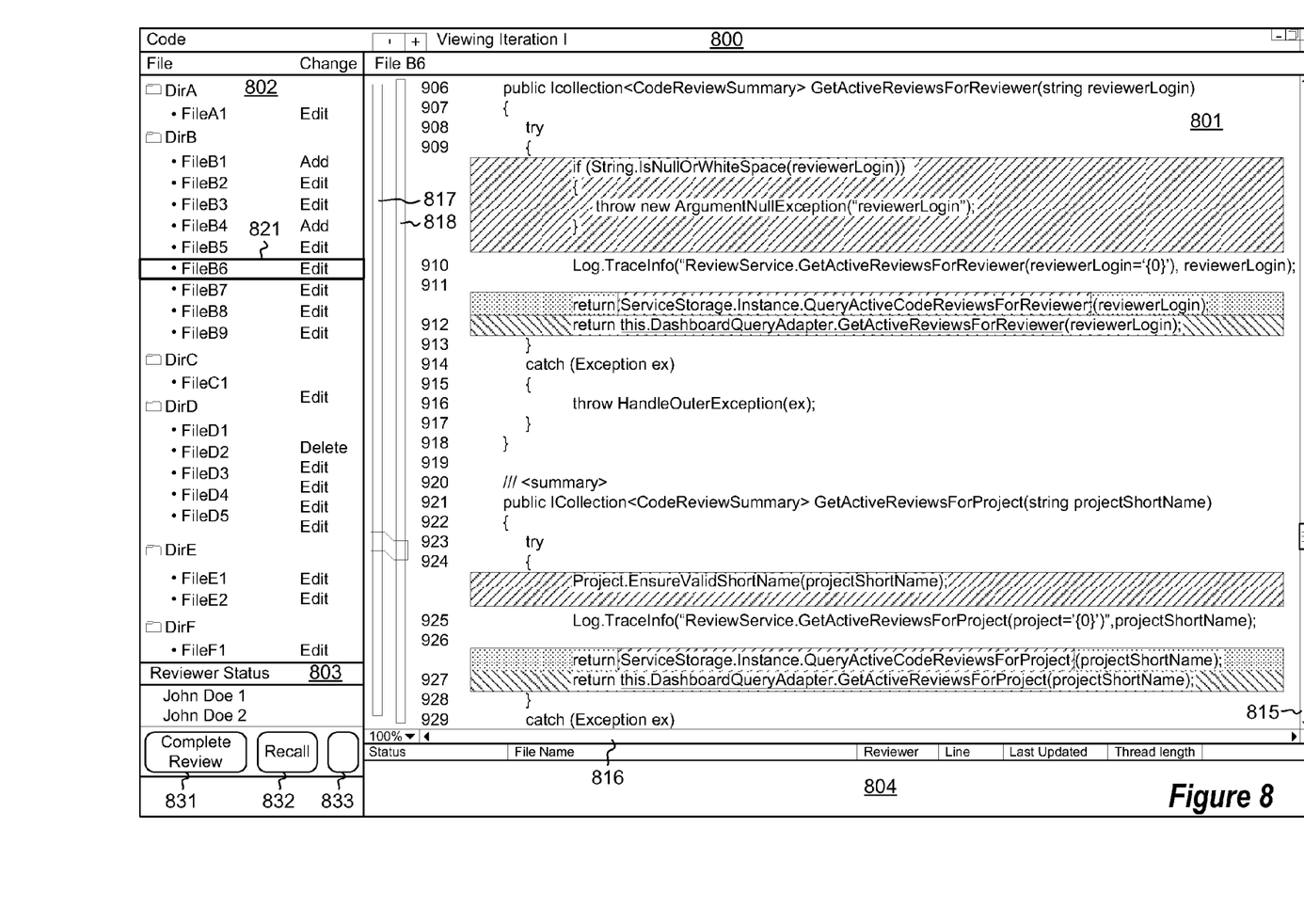
FIG. 8 illustrates an example user interface that shows a differential view in which revision changes are shown as code decorations.
Figure 9:
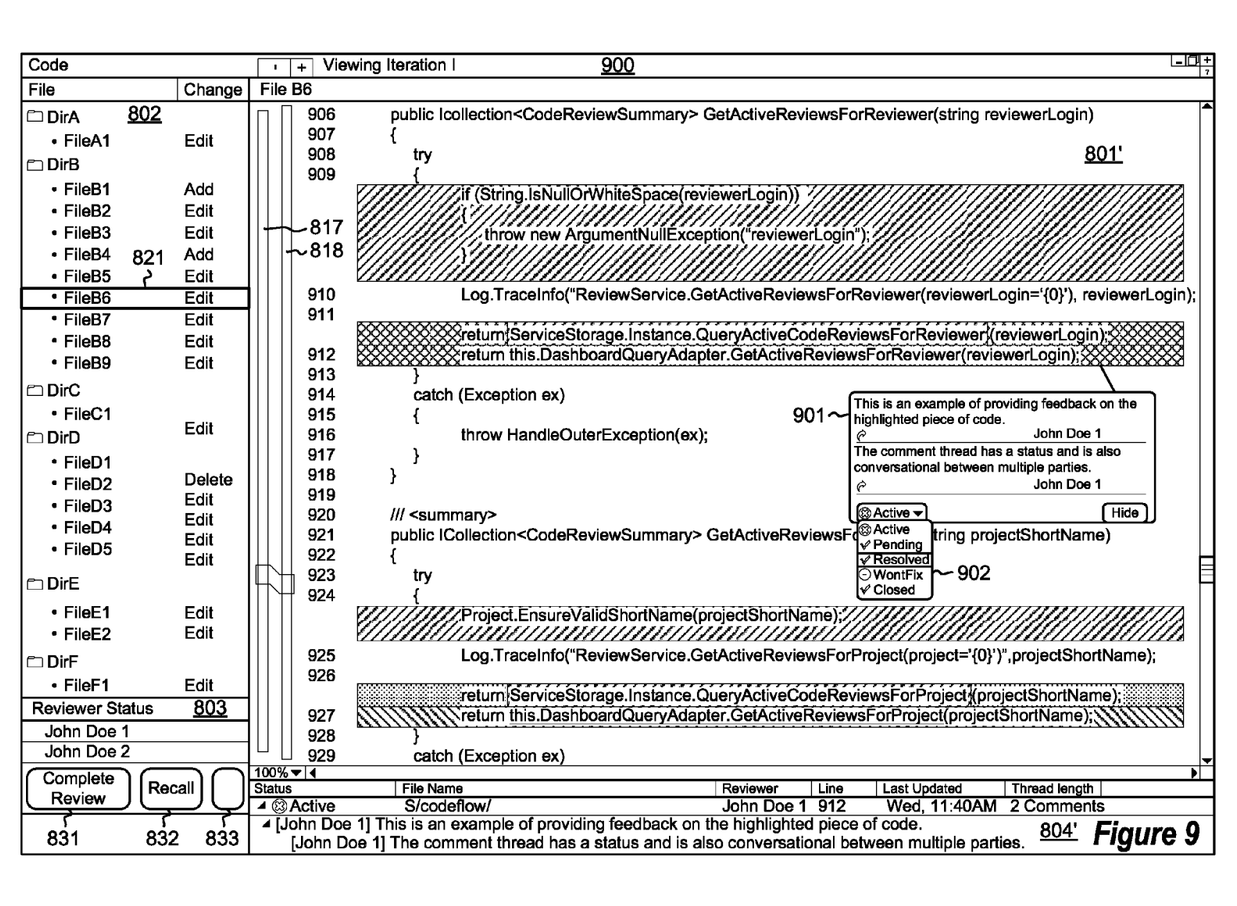
FIG. 9 illustrates an example user interface that is similar to the user interface of FIG. 8, except that now discussion thread decorations adorn the code, and which is used to show how a client-side application may be updated with a discussion thread in response to an update notification from the review service.

FIGS. 8 and 9 illustrate example user interfaces that represent user interfaces for client-side applications. These examples demonstrate an example client experience when notified of an updated to the target review artifact set. In the illustrated cases, the primary goal component is a source code document, of which lines 906 through 929 are shown. Understanding that these are just examples, FIGS. 8 and 9 will now be described in further detail.

FIG. 8 illustrates a differential view user interface 800 that includes a code view area 801 that shows a differential view comparing multiple versions of the code referred to herein as an "original version" and a "revised version". The user interface 800 also includes a file selection area 802, a reviewer status area 803, and a comment view area 804. The file selection area 802 lists several code files that could be reviewed, with file 821 being selected. The selected code file 821 is displayed in the code view area 801. Since the code under review is much larger than can be displayed in the code view area (as would most often be the case), the code view area 801 has several navigation aids. For instance, the code view area 801 has a vertical scroll bar 815 and a horizontal scroll bar 816, which are activated to be in use whenever the vertical scope and horizontal scope, respectively, of the code exceed that illustrated in the code view area 801. The code view area 801 also has position reference indicators 817 and 818 that represent the current vertical position of the viewable code within the entire scope of the code. In particular, reference indicator 817 represents the position of the viewable code within the original version of the code, and reference indicator 818 represents the position of the viewable code within the revised version of the code.

The use of a differential view allows the review to quickly ascertain the differences between different versions of the code, so that they can focus more deeply on specific changes made between versions. The principles described herein are not limited to the manner of visualization or the actual visualization itself of the differences between versions of the code. However, the use of color is one of an infinite variety of ways in which differentiation could be visualized.

That said, the use of color is avoided in this patent application. Instead, areas marked with rightward facing hashed boxes are used instead of red highlighting in FIG. 8 (but such areas will be still be referred to herein as being "red-highlighted" with reference to FIG. 8). Furthermore, areas marked with leftward facing hashed boxes are used instead of yellow highlighting in FIG. 8 (but such areas will still be referred to as being "yellow-highlighted" with reference to FIG. 8). Areas marked with underlining in FIG. 8 are used instead of green highlighting in FIG. 8 (but such areas will still be referred to as being "green-highlighted" with reference to FIG. 8). Areas marked with dots are used instead of pink highlighting in FIG. 8 (but such areas will still be referred to as being "pink-highlighted" with reference to FIG. 8).

Referring to FIG. 8, the code view area compares two versions of the code called herein an original version, and a revised version. Lines that are entirely highlighted in red (with rightward facing hash marking in FIG. 8) are lines that have been entirely removed in the current version compared to the reference version. Lines that have both red portions (right hashing) and pink portions (dotted in FIG. 8) are lines in which there have been removals made, but in which the red portions (right hashing) are the specific portions removed. Lines that are entirely highlighted in green (underlining in FIG. 8) are lines that have been entirely added in the current version compared to the reference version, although there are no examples of such lines in FIG. 8. Lines that have both yellow portions (left hashing) and green portions (underlined) are lines in which there have been additions made, but in which the green portions (left hashing) are the specific portions added.

The differential view user interface 800 also illustrates a reviewer status area 803 and a comments area 804. The reviewer status area 803 allows a reviewer to select a control 831 to indicate that the reviewer has signed off on the current version of the code. The control 832 allows the reviewer to recall a prior sign-off on the code. The control 833 permits the reviewer to instant message with others on the review team.

The comments area 804 permits a different view on the comments that are displayed in the code view area 801. However, as there are no comments displayed in the code view area 801 in FIG. 8, there are likewise no comments displayed in the comments area 804 of FIG. 8.

Accordingly, FIG. 8 illustrates a differential view user interface 800 that includes revision marking or some other visualization that compares versions of the displayed code.

FIG. 9 illustrates a differential view user interface 900 that is similar to the user interface 800 of FIG. 8. In fact, the differential view user interface 900 may be the same user interface as that of FIG. 8, except that now comments have been added to the code and associate with a specific portion of the code (in this case, line 912 of the code). The comments decoration 901 includes a discussion thread that may include comments from multiple commenters. It is this discussion thread that may be updated when the reviewing computing system notifies the client-side application that a new comment has been added to the discussion thread. The comments decoration 901 also may include a visualization (in this case drop down box 902) that indicates a status of comments decoration (in this case, the status of the discussion thread). As another example, the status visualization might indicate a severity of the comments decoration. In the case of the thread status drop down box 902 of FIG. 9, an active status indicates that that the thread has been created by a reviewer, but the subject of the discussion thread has not yet been addressed by the author. A pending status indicates that the author agrees with the reviewer, but has not yet applied a fix. A resolved status indicates that the author has fixed the issue or answered the reviewer's question. A "wontfix" status indicates that the author does not agree with the suggestion of the discussion thread, and hence the author provided an explanation of their point of view and marked the thread as "won't fix". A closed status indicates that the author and reviewer confirm the fix.

The comments area 804' of FIG. 9 is slightly different as compared to the comments area 804 of FIG. 8 in its content. The comments area 804' now has a different view on all of the displayed comments in the code view area 801'.

Accordingly, a multi-tenant collaborative review service and collaboration environment has been described. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computer system that includes one or more processors and that is configured to operate a multi-tenant collaborative review service, for facilitating collaborative review of a primary goal component, the method comprising:

an act of providing a plurality of collaborative functions, including one or more common functions of the multi-tenant collaborative review service that provide common functionality across a plurality of tenants of the multi-tenant collaborative review service for facilitating review of at least one corresponding primary goal component of each of the plurality of tenants;

an act of providing an extensibility point of the multi-tenant collaborative review service into which one or more tenant-specific functions that are each specific to only a subset of the plurality of tenants may be incorporated into the multi-tenant review service, each tenant-specific function being provided by a particular tenant of the plurality of tenants, at least one tenant-specific function causing the multi-tenant review service to provide functionality for facilitating review of a corresponding primary goal component of a first tenant of the plurality of tenants that is not provided to at least a second tenant of the plurality of tenants;

an act of receiving an instruction from one of the plurality of tenants to modify a corresponding tenant-specific function of the one or more tenant specific functions; and an act of modifying the corresponding tenant-specific function in accordance with the instruction from the one of the plurality of tenants.

2. The method in accordance with claim 1, wherein the instruction is received through an application programming interface, and the act of modifying occurs automatically.

3. The method in accordance with claim 1, wherein the act of modifying the tenant-specific function comprises:

an act of adding a tenant-specific function to the one or more tenant specific functions.

4. A computer program product comprising one or more physical storage memory devices having stored thereon computer-executable instructions that are structured such that, when executed by one or more processors of a computing system, cause the computing system to operate a multi-tenant collaborative review service that facilitates collaborative review of a primary goal component, including the following:

an act of providing a plurality of common functions of the multi-tenant collaborative review service that are available across a plurality of tenants supported by the review service; and an act of providing an extensibility point of the multi-tenant collaborative review service into which one or more tenant-specific functions may be incorporated into the multi-tenant review service, and with which a tenant of the plurality of tenants is enabled to modify a corresponding tenant-specific function of the one or more tenant-specific functions, wherein for at least one of the plurality of tenants, a corresponding review target artifact set is distributed among first storage at the multi-tenant collaborative review service and second storage at the at least one of the plurality of tenants, such that a primary goal component of the review target artifact set that is the subject of collaboration is maintained uniquely accessible by the corresponding tenant at the second storage, and such that one or more secondary components of the review target artifact set that are in support of the collaborative review of the primary goal component are maintained remote from the corresponding tenant at the first storage.

5. The computer program product in accordance with claim 4, wherein the primary goal component includes a source code document.

6. The computer program product in accordance with claim 4, wherein the primary goal component includes a text document.

7. The computer program product in accordance with claim 4, wherein the primary goal component includes an image.

8. The computer program product in accordance with claim 4, wherein the one or more secondary components include thread data that includes a plurality of discussion threads, each discussion thread commenting on a corresponding portion of the primary goal component.

9. The computer program product in accordance with claim 8, wherein the review service is further configured to update at least some of members of a corresponding tenant when one of the plurality of discussion threads is updated with an additional comment.

10. The computer program product in accordance with claim 4, wherein the review service provides an application programming interface through which the review service and a tenant may communicate.

11. The computer program product in accordance with claim 4, wherein the review service also maintains tenant-specific metadata regarding the primary goal component.

12. The computer program product in accordance with claim 11, wherein the tenant-specific metadata includes a status of the member with respect to a review of the primary goal component corresponding to the tenant.

13. The computer program product in accordance with claim 11, wherein the tenant-specific metadata includes membership of the corresponding tenant.

14. The computer program product in accordance with claim 4, wherein the review service is further configured to update at least some of members of a corresponding tenant when the primary goal component, or one or more of the secondary components corresponding to the primary goal component is updated.

15. A computer system, comprising:
one or more processors; and
one or more computer storage media having stored thereon computer-executable instructions that are structured such that, when executed by the one or more processors of the computing system, cause the computing system to operate a multi-tenant collaborative review service that facilitates collaborative review of comprising primary goal component, including the following:
an act of providing a plurality of common functions of the multi-tenant collaborative review service that are available across a plurality of tenants supported by the review service; and
an act of providing an extensibility point of the multi-tenant collaborative review service into which one or more tenant-specific functions may be incorporated into the multi-tenant review service, each tenant-specific function being provided by a particular tenant of the plurality of tenants, the extensibility point being configured to enable each tenant to modify any corresponding one or more tenant-specific functions, at least one tenant-specific function causing the multi-tenant review service to provide functionality to a first tenant of the plurality of tenants that is not provided to at least a second tenant of the plurality of tenants,
wherein for at least one of the plurality of tenants, a corresponding review target artifact set is distributed among first storage at the multi-tenant collaborative review service and second storage at the at least one of the plurality of tenants, such that a primary goal component of the review target artifact set that is the subject of collaboration is maintained uniquely accessible by the corresponding tenant at the second storage, and such that one or more secondary components of the review target artifact set that are in support of the collaborative review of the primary goal component are maintained remote from the corresponding tenant at the first storage.

16. The computer system in accordance with claim 15, wherein the primary goal component comprises a source code document.

17. The computer system in accordance with claim 16, one or more secondary components comprise at least one comments on the source code document.

18. The computer system in accordance with claim 15, further comprising:
an act of receiving an instruction from one of the plurality of tenants to modify a corresponding tenant-specific function; and
an act of modifying the tenant-specific function in accordance with the instruction.

19. The computer system in accordance with claim 18, wherein the act of modifying the tenant-specific function comprises one or more of:
an act of adding a tenant-specific function to the one or more tenant specific functions, or
an act of modifying a tenant-specific function of the one or more tenant specific functions.

* * * * *